United States Patent
Keller et al.

(10) Patent No.: US 10,107,345 B2
(45) Date of Patent: Oct. 23, 2018

(54) ADJUSTING UNIT FOR AN AUTOMATIC SLACK ADJUSTER

(71) Applicant: WABCO Europe BVBA, Brussels (BE)

(72) Inventors: Marcus Keller, Weinheim (DE); Markus Stafflinger, Bensheim (DE)

(73) Assignee: WABCO Europe BVBA, Brussels (BE)

( * ) Notice: Subject to any disclaimer, the term of this patent is extended or adjusted under 35 U.S.C. 154(b) by 140 days.

(21) Appl. No.: 15/145,146

(22) Filed: May 3, 2016

(65) Prior Publication Data

US 2016/0333952 A1 Nov. 17, 2016

(30) Foreign Application Priority Data

May 11, 2015 (EP) ..................................... 15001411

(51) Int. Cl.
*F16D 65/68* (2006.01)
*F16D 65/60* (2006.01)
*F16D 51/00* (2006.01)

(52) U.S. Cl.
CPC ............. *F16D 65/68* (2013.01); *F16D 65/60* (2013.01); *F16D 51/00* (2013.01)

(58) Field of Classification Search
CPC .......... F16D 65/68; F16D 65/60; F16D 51/00; F16D 65/56; B61H 15/00
See application file for complete search history.

(56) References Cited

U.S. PATENT DOCUMENTS

| 3,392,810 | A | | 7/1968 | Svensson | |
|---|---|---|---|---|---|
| 4,380,276 | A | * | 4/1983 | Sweet | F16D 65/60 188/196 BA |
| 5,222,579 | A | | 6/1993 | Frania | |
| 5,327,999 | A | | 7/1994 | Nelander | |
| 6,408,993 | B1 | * | 6/2002 | Truuvert | F16D 65/60 188/196 BA |

(Continued)

FOREIGN PATENT DOCUMENTS

| WO | 03/083322 A1 | 10/2003 |
|---|---|---|
| WO | 2010/016812 A1 | 2/2010 |

OTHER PUBLICATIONS

European Search Report from corresponding European Application No. EP 15 00 1411 dated Oct. 21, 2015.

*Primary Examiner* — Xuan Lan Nguyen
(74) *Attorney, Agent, or Firm* — Brinks Gilson & Lione

(57) ABSTRACT

An adjusting unit for an automatic slack adjuster of a vehicle drum brake includes a housing (19), a worm shaft (2) mounted in the housing (19) so as to be movable between two end positions along an axial travel (A), a control pinion (9) arranged on the worm shaft, a worm (7) arranged on the worm shaft, and a freewheel (13) for power transmission between the control pinion (9) and the worm (7) in a first direction of rotation and for slip between the control pinion (9) and the worm (7) in an opposite, second direction of rotation. The worm shaft (2) has a first stop surface (3) and a second stop surface (5), which can each be brought into contact with a corresponding first stop (25) and second stop (21) at the end positions of the housing (19). An automatic slack adjuster includes such an adjusting unit.

17 Claims, 4 Drawing Sheets

(56) References Cited

U.S. PATENT DOCUMENTS

| | | | |
|---|---|---|---|
| 7,757,824 B2 * | 7/2010 | Echambadi | F16D 65/60 188/79.55 |
| 8,215,460 B2 | 7/2012 | Li | |
| 8,245,820 B2 * | 8/2012 | Echambadi | F16D 65/562 188/196 BA |
| 8,672,101 B2 | 3/2014 | Louis et al. | |
| 2007/0137354 A1 * | 6/2007 | Botalenko | F16D 65/60 74/425 |
| 2010/0288590 A1 | 11/2010 | Echambadi et al. | |
| 2014/0216865 A1 * | 8/2014 | Gripemark | F16D 65/60 188/79.55 |

* cited by examiner

ADJUSTING UNIT FOR AN AUTOMATIC SLACK ADJUSTER

TECHNICAL FIELD

The present invention relates to an adjusting unit for an automatic slack adjuster of a brake, in particular of a commercial vehicle drum brake, wherein the adjusting unit has: a housing, a worm shaft, which is mounted in the housing so as to be movable between two end positions by an axial travel, a control pinion arranged on the worm shaft, a worm arranged on the worm shaft, and a freewheel, which is designed for power transmission between the control pinion and the worm in a first direction of rotation and for slip between the control pinion and the worm in an opposite, second direction of rotation.

BACKGROUND

Automatic slack adjusters having adjusting mechanisms are known from EP 01917451 B1, EP 02307757 A1, EP 02352931 B1, EP 0598290 A1, EP 0598290 B1, U.S. Pat. Nos. 7,757,824 B2, 8,215,460 B2, 8,245,820 B2 and WO 02003/083322 A1, for example.

In connection with drum brakes, automatic slack adjusters are known across the industry and are used to control the release clearance between the brake lining and the brake drum. Here, it is the task of automatic adjusting units for slack adjusters to prevent the release clearance between the brake lining and the drum brake from becoming too small or too large. If the gap between the brake lining and the brake drum is too small, increased brake lining wear occurs and, in extreme situations, instances of overheating can furthermore occur. In contrast, an excessive air gap between the brake lining and the brake drum has the effect that the braking force is not transmitted to a sufficient extent to the brake system. Thus, variation in the release clearance has direct effects on the braking performance of the drum brake. Since several drum brakes are usually used on commercial vehicles, e.g. one drum brake being arranged on each wheel, it is essential for safe operation of the vehicle that the release clearance should vary as little as possible between the various drum brakes. If, for example, a release clearance on the right-hand side of an axle were significantly smaller at the brake provided there than on the opposite, left-hand side, the braking action would be different and the vehicle would pull to the right during braking. The release clearance thus has an effect not only on the braking action itself but also on the balancing of the vehicle.

It has proven disadvantageous in the prior art that the release clearance in the case of known principles of operation, e.g. in accordance with the publications indicated at the outset, still fluctuates, in some cases by as much as 50%, despite complex and sophisticated adjusting mechanisms. In the prior art, this problem has hitherto been counteracted by manufacturing the individual components of the adjusting units for the automatic slack adjusters with very tight tolerances, entailing a high outlay in terms of time and money. It is furthermore regarded as disadvantageous in the prior art that the assembly of the, in some cases highly complex, units is an involved process.

SUMMARY

Given this background situation, it was the underlying object of the invention to indicate an adjusting unit for an automatic slack adjuster which as far as possible mitigates the disadvantages discovered. In particular, it was the underlying object of the invention to improve an adjusting unit of the type designated at the outset in such a way that the release clearance of the slack adjuster fluctuates less. In particular, it was furthermore additionally the underlying object of the invention to improve the adjusting unit designated at the outset in such a way that assembly is simplified.

The invention achieves the object underlying it in the case of an adjusting unit of the type designated at the outset having the features of claim 1. In particular, the adjusting unit is distinguished by the fact that the worm shaft has a first and a second stop surface, which can each be brought into contact with a corresponding stop at the end positions of the housing. In the adjusting unit according to the present invention, it is, in particular, the axial travel which defines the release clearance of the slack adjuster. The invention thus follows the approach that the axial travel of the adjusting unit should fluctuate as little as possible. The invention engages with this in that the two end positions are defined on the shaft side by the first and second stop surfaces on the worm shaft itself. This means that, apart from the corresponding stop positions in the housing, which must be present in any case, just one further component, namely the worm shaft itself, has to be designed with tight tolerances. By the embodiment according to the invention, the formation of a tolerance chain, which has been found to be disadvantageous in the prior art, is thus avoided. At the same time, two advantageous effects are thereby achieved. On the one hand, it becomes possible to maintain tighter tolerances than hitherto and, on the other hand, this is accomplished simultaneously with a reduced outlay on production since only the distance between the two stop surfaces has to be toleranced.

The control pinion is preferably designed to engage in a control disk of the automatic slack adjuster, said control disk being, in particular, connected for conjoint rotation to a control arm. The control arm is preferably part of the slack adjuster. The worm is preferably designed to engage in a worm wheel of a drive shaft, wherein the worm wheel is set in rotation by the worm when the worm shaft is in one of the two end positions in the housing. The worm wheel is preferably connected operatively to the drive shaft via a coupling, wherein the drive shaft is in operative connection with a motion mechanism of the brake linings. Such a motion mechanism is known by the term "S cam," for example.

The freewheel is preferably arranged so as to act between the control pinion and the worm shaft, or arranged directly between the control pinion and the worm, or arranged between the worm shaft and the worm.

The worm wheel in which the worm of the adjusting unit engages is preferably coupled via a coupling to a drive shaft, which, for its part, is designed to drive the motion mechanism for adjusting the brake linings.

The invention is advantageously developed by arranging the worm for conjoint rotation on the worm shaft, the worm preferably being formed integrally with the worm shaft, and by coupling the control pinion to the worm shaft via the freewheel. By virtue of the fact that the worm is arranged for conjoint rotation on the worm shaft and, as a particularly preferred option, is formed integrally with the worm shaft, the ease of assembly of the adjusting unit is improved overall. In terms of assembly, it is thereby made possible for the control pinion to be mounted on the component consisting of the worm and the shaft. At the same time, the stop surfaces of the worm shaft define the dimensional accuracy with respect to the release clearance, as before, and therefore the axial dimensions of the control pinion are not critical and said pinion can be manufactured in a significantly more advantageous way.

In an alternative embodiment, the control pinion is preferably arranged for conjoint rotation on the worm shaft, and the worm is coupled to the worm shaft via the freewheel. The same advantages in terms of the economics of production as those already described above with reference to the optimum connection between the worm and the worm shaft can also be achieved with unlimited scope in respect of the fixed connection between the control pinion and the shaft.

The adjusting unit is preferably developed in that it has an axial spring, which is operatively connected to the housing and the worm shaft and is designed to preload the worm shaft in the direction of the second stop. Due to the preload in the direction of the second stop, the release clearance inherent in the design is maintained and a normal position of the worm shaft is defined.

In another preferred embodiment of the invention, the first stop surface is designed as a shaft end. As a further preferred option, the second stop surface is designed as a shaft shoulder.

As a particularly preferred option, the worm shaft has a sliding bearing section supported loosely in the housing adjacent to the second stop surface. The latter measure is advantageous particularly when the worm is designed so as to be connected integrally to the worm shaft. According to this embodiment, it is possible to dispense with a separate bearing sleeve of the kind hitherto found in the prior art. Apart from the maintenance of the same high dimensional accuracy, the outlay on production and ease of assembly are thereby further optimized. In a preferred embodiment, the sliding bearing section is formed from a hardened metallic material.

In a particularly preferred embodiment, the worm and the control pinion are arranged between the first and second stop surfaces in the axial direction.

In the adjusting unit according to the invention, the freewheel is preferably designed as: a wrap spring, roller freewheel, bevel toothing with a preload, locking pawl or a combination of the above.

In the adjusting unit according to the invention, the axial spring is preferably designed as: a helical spring, diaphragm spring, wave spring or a combination of the above.

In another preferred embodiment, the control pinion is mounted on the worm shaft and has a recess for accommodating the axial spring, preferably on a side facing the first stop surface. Owing to the fact that the axial spring enters the control pinion on the side facing the first stop, the axial spring presses the control pinion onto the worm shaft without the need at the same time to take account of any effect of the control pinion on dimensional accuracy. As before, this is defined by the first and second stop surfaces on the worm shaft. In the normal state, the axial spring preferably presses the first stop surface away from its end position and has an effect such that, instead, the second stop surface is in contact with the housing in the corresponding, opposite end position. Due to this advantageous arrangement of the axial spring too, it is thus possible to dispense with a multiplicity of further fastening and guide means, such as screwed joints, guides or the like. The total number of components required is significantly smaller than hitherto known from the prior art, making assembly even simpler.

In a further aspect, the invention relates to an automatic slack adjuster for a drum brake, in particular a commercial vehicle drum brake. According to the invention, it is proposed that the automatic slack adjuster has an adjusting unit according to one of the preferred embodiments described herein. In respect of the advantages and technical effects of the automatic slack adjuster, attention is to this extent drawn to the above remarks. The automatic slack adjuster has the same preferred embodiments as the adjusting unit according to the invention.

In another aspect, the invention relates to a vehicle, in particular a commercial vehicle, having a number of wheels, wherein one, a plurality or all of the wheels are braked by a drum brake, wherein one, a plurality or all of the drum brakes is/are assigned an automatic slack adjuster having an adjusting unit. According to the invention, it is proposed that this is an adjusting unit according to one of the preferred embodiments described herein, or an automatic slack adjuster according to one of the preferred embodiments described herein.

The invention is described in greater detail below with reference to the attached figures by way of a preferred illustrative embodiment. The figures are not necessarily intended to show the illustrative embodiment to scale. On the contrary, the figure is drawn in schematic and/or slightly distorted form where conducive to explanation. As regards additions to the teachings that are directly evident from the figures, attention is drawn to the relevant prior art. It should be taken into account here that many different modifications and changes as regards the form and detail of an embodiment can be made without departing from the general concept of the invention. The features of the invention which are disclosed in the description, in the figures and in the claims may be significant for the development of the invention both individually and in any desired combination. Moreover, all combinations of at least two of the features disclosed in the description, the figures and/or the claims fall within the scope of the invention. The general concept of the invention is not restricted to the exact form or detail of the preferred embodiments shown and described below or restricted to any subject matter which would be limited in comparison with the subject matter claimed in the claims. Where dimension ranges are given, the intention is that values within said limits should also be disclosed and be capable of being used and claimed, where desired, as limiting values. Further advantages, features and details of the invention will become apparent from the following description of the preferred illustrative embodiments and from the figures. For the sake of simplicity, the same reference signs are used below for identical or similar parts or parts with an identical or similar function.

The drawings are provided herewith for purely illustrative purposes and are not intended to limit the scope of the invention

BRIEF DESCRIPTION OF THE DRAWINGS

In particular.

DETAILED DESCRIPTION OF THE DRAWINGS

Figure 1A:
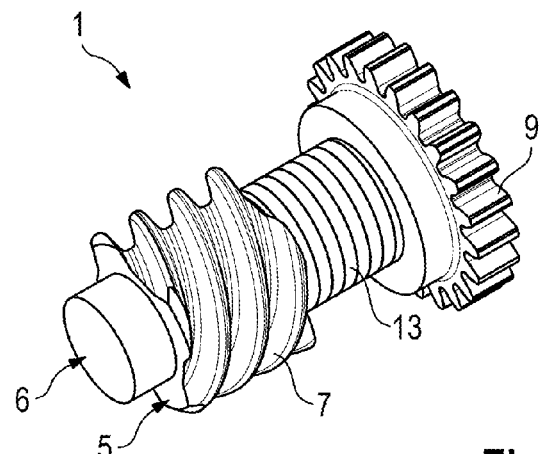
FIGS. 1a and 1b show a schematic illustration of a core of the adjusting unit according to a preferred illustrative embodiment.
Figure 1B:
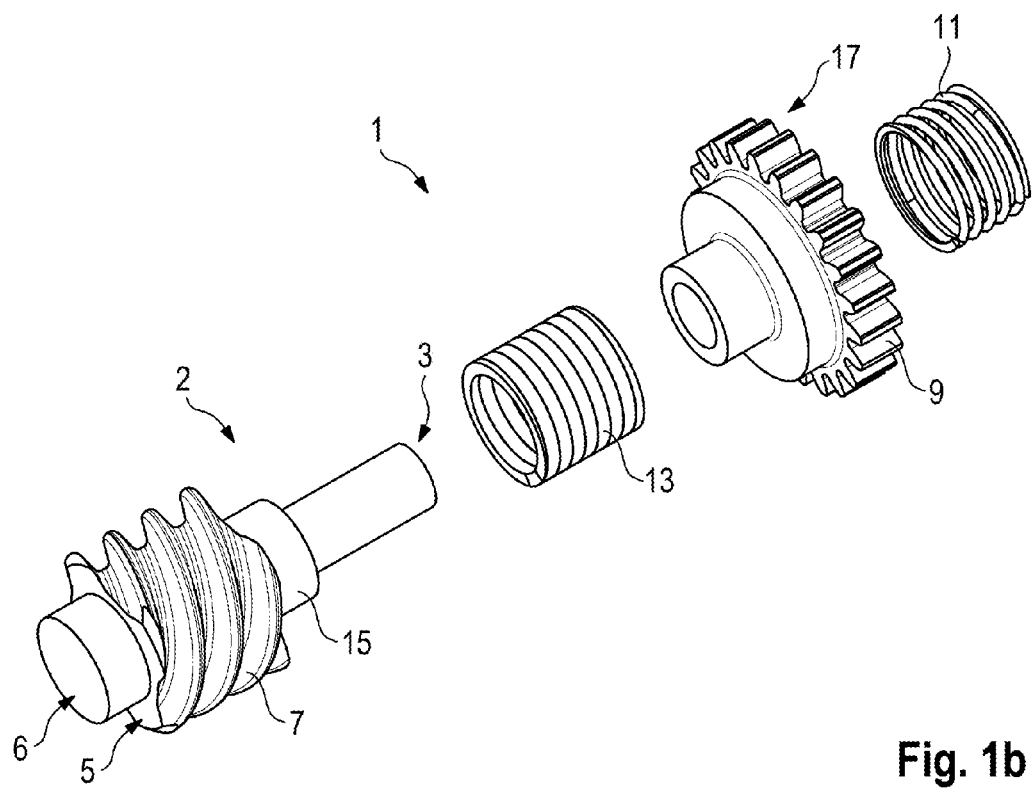

FIGS. 1a and 1b show an adjusting unit 1 according to a preferred illustrative embodiment in exposed form, i.e. without the surrounding housing. The adjusting unit 1 has a worm shaft 2, which has a first stop surface 3 and a second stop surface 5.

Figure 2:
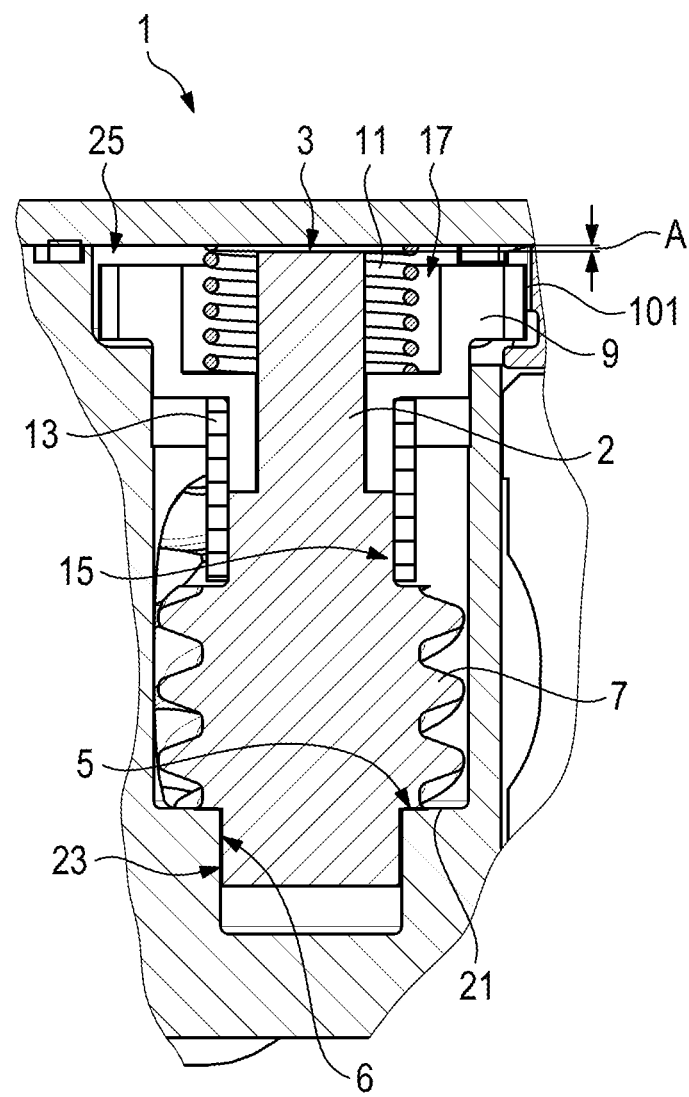
FIG. 2 shows the adjusting unit according to FIGS. 1a and 1b in section in the installed position.

In the present example, the first stop surface 3 is designed as a shaft end, while the second stop surface 5 is designed as a shaft shoulder. Formed on the worm shaft 2 at an end opposite the first stop surface 3 is a sliding bearing section 6, which is designed to be inserted into a corresponding guide hole in a housing (FIG. 2). The worm shaft 2 has a worm 7, which, in the preferred illustrative embodiment, is arranged firmly on the worm shaft 2, in particular being formed integrally therewith.

The adjusting unit 1 furthermore has a freewheel 13, which, in the present case, is designed as a wrap spring. The freewheel 13 and a control pinion 9 can be mounted on the worm shaft 2, wherein the freewheel 13 is pushed onto a shaft shoulder 15 and is designed to bring about power or torque transmission between the control pinion 9 and the worm 7 in a first direction of rotation, while, in the opposite, second direction of rotation, the freewheel 13 ensures slip between these two components 9, 7.

The adjusting unit 1 furthermore has an axial spring 11, which is accommodated in a recess 17 in the control pinion 9. The axial spring 11 is designed to press the freewheel 13 and the control pinion 9 in the direction of the second stop surface 5 and thus hold it on the worm shaft 2.

In FIG. 2, the adjusting unit 1 is shown in the installed position within the housing 19 (indicated by a box in dashed lines). The worm shaft 2 is inserted via its sliding bearing section 6 into a corresponding guide recess 23. In the operating state shown, the second stop surface 5 is in contact with a corresponding second stop 21 in the housing 19. Owing to the action of the axial spring 11, the first stop surface 3 is spaced apart from a corresponding first stop 25 of the housing 19 by an axial travel A. The axial travel A defines the release clearance of the drum brake, as will be explained below with reference to FIG. 4.

The control pinion 9 engages in a control disk 101. From FIG. 2, it is clear that the distance between the first and second stop surfaces 3, 5 of the worm shaft 2 is such as to permit both the worm 7 and the control pinion 9 to be situated between these two stop surfaces, and therefore the axial travel A is composed of a single tolerance. In practice, the axial travel A will preferably be of the order of a few tenths of a millimeter.

Figure 3:
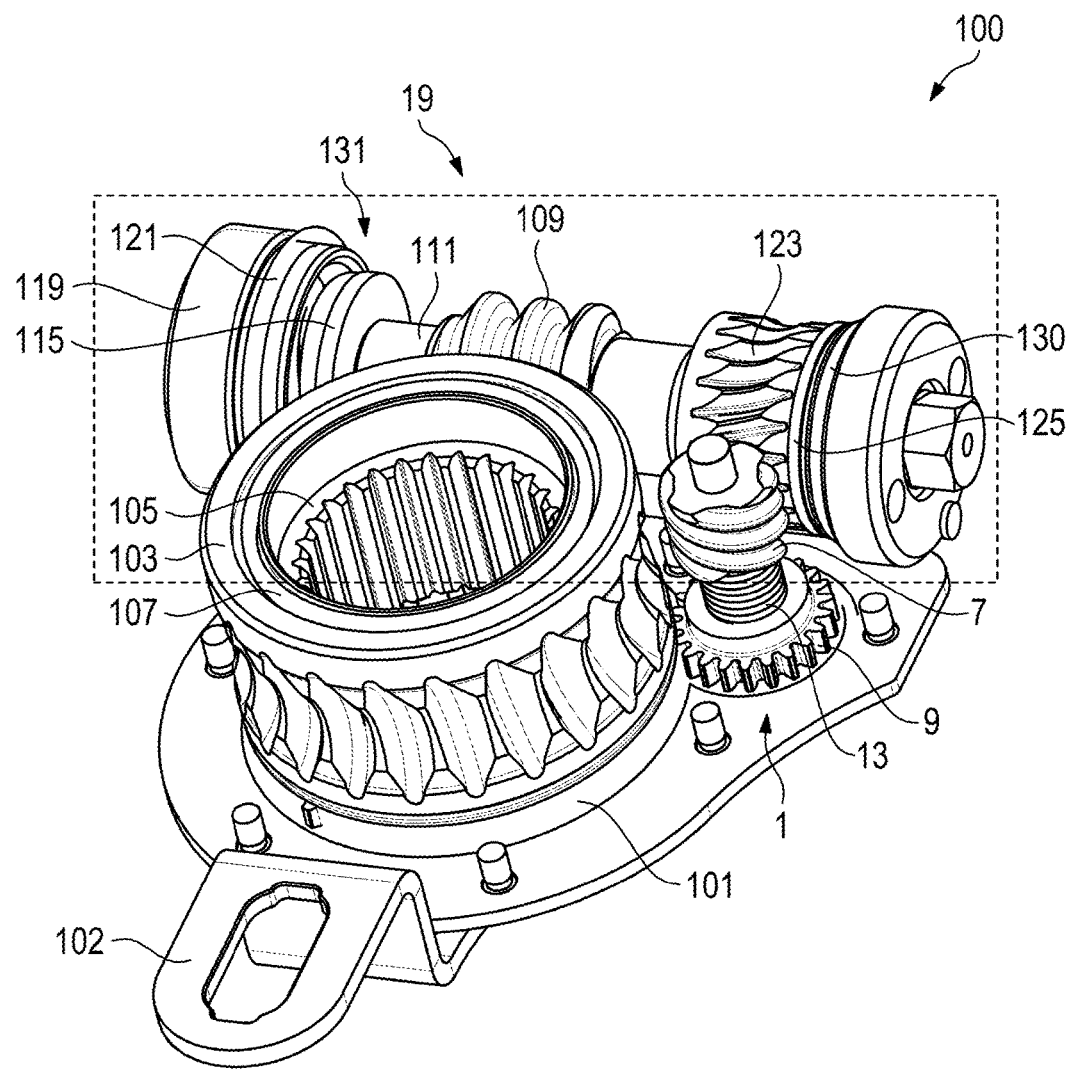
FIG. 3 shows a schematic illustration of an automatic slack adjuster with the housing screened out.

In FIG. 3, the adjusting unit 1 is shown in its structural and functional interaction with further components of a slack adjuster 100. Apart from the adjusting unit 1, the slack adjuster 100 has a control arm 102, which is firmly connected to the control disk 101. The slack adjuster 100 furthermore has a driving wheel 103, which is designed, owing to an internal profile 105, to control a motion mechanism for actuating the brake linings in a drum brake.

By a sealing ring 107, this output section can be sealed in a leaktight manner relative to a surrounding housing.

The driving wheel 103 is in engagement with a driving worm 109 of a drive shaft 111.

The drive shaft 111 is rotatably mounted in the housing 19. Arranged on the drive shaft 111 on the upper left-hand side in FIG. 3 is a compression spring 113 (shown in FIG. 4), which is arranged so as to act against a spring seat 115 and is covered by a spring cover 119 and a corresponding sealing ring 121.

The drive shaft 111 furthermore has an adjustment toothing 123, which is in engagement with the worm 7 of the adjusting unit 1.

Arranged on the upper right-hand side in FIG. 3 is a bearing 125, via which the drive shaft 111 is accommodated rotatably in the housing 19.

Figure 4:
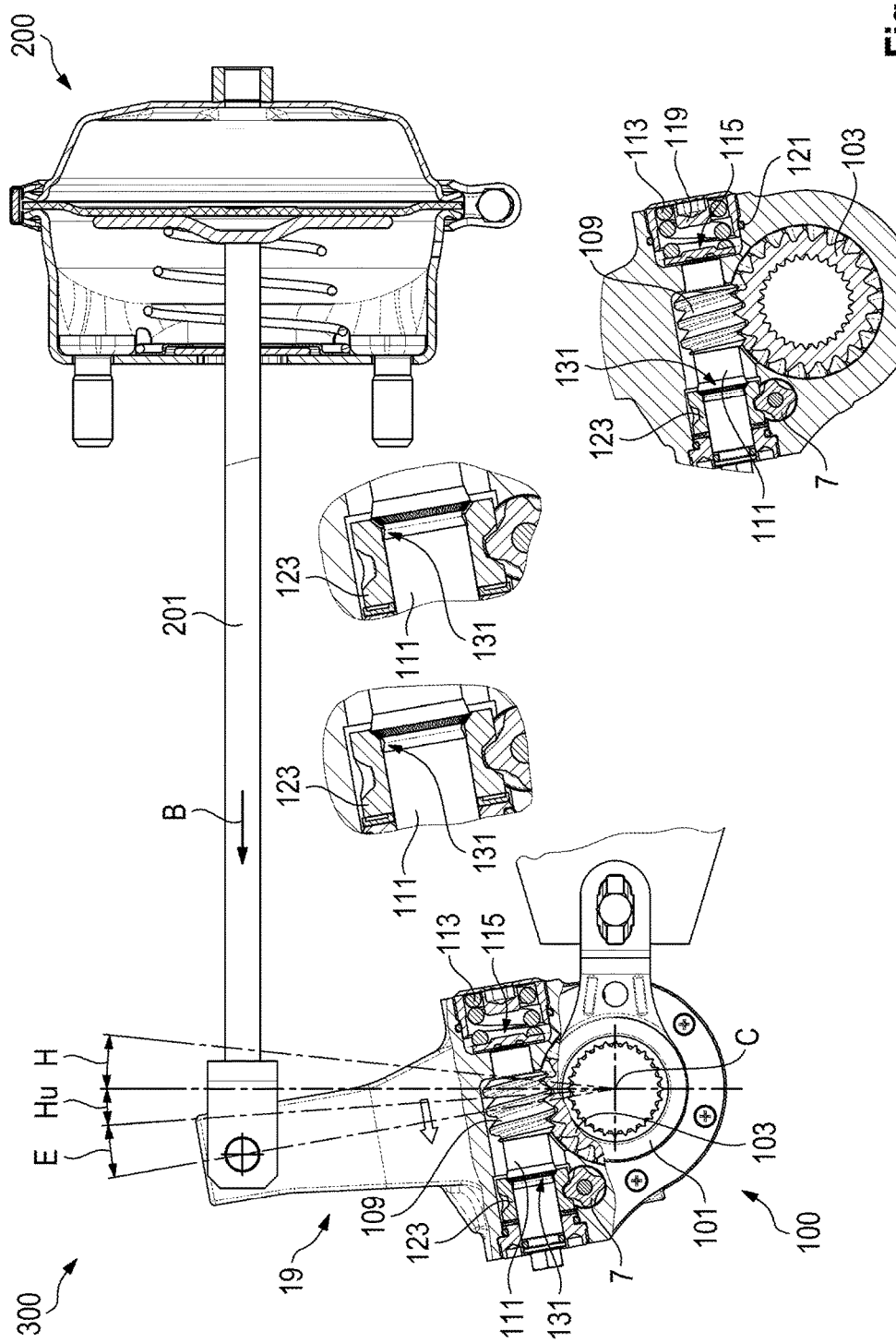
FIG. 4 shows a schematic illustration of a commercial vehicle having a drum brake and an automatic slack adjuster according to the preferred illustrative embodiment.

The fundamental sequences of motion are explained in greater detail with reference to FIG. 3 and the schematic illustration in FIG. 4.

The drive shaft 111 has a claw clutch 131, which is designed to prevent power transmission between the adjustment toothing 123 and the driving worm 109 and to decouple the claw clutch 131 when a predefined force is exceeded by overcoming the compression spring 113.

If a brake 200 is actuated in a vehicle 300, the applied braking force is transmitted to the housing 19 of the slack adjuster via a connecting rod 201 in the direction of the arrow B, this then being converted into a pivoting motion about the axis of rotation C. Owing to the pivoting of the housing 19, the driving wheel 103 is rotated counterclockwise because it is taken along by the driving worm 109 of the drive shaft 111 in the axial direction thereof. Likewise owing to the pivoting motion, the control pinion 9 rolls on the control disk 101. On continued movement of the connecting rod in the direction of the arrow B, the housing 19 initially traverses a pivoting range H, which stands for the nominal travel, before it traverses a range HU, which stands for an excessive travel due to progressive wear of the brake linings. When the brake linings are resting on the drum brake, the housing 19 is subject to further elastic deformation by a range E owing to elastic deformation if a braking force continues to be applied.

Initially, slip occurs between the control pinion 9 and the worm 7 because the freewheel 13 prevents power transmission between the control pinion 9 and the worm 7 in this direction of movement. Consequently, the movement of the rolling control pinion 9 is not transmitted to the worm 7. Thus, although the claw clutch 131 of the drive shaft 111 is still in nonpositive engagement initially as the brake actuation begins, no rotation of the drive shaft 111 is initiated. Consequently, there can be no adjustment of the release clearance during normal braking operations.

If the brake linings are resting in the brake drum and further braking force is transmitted in the direction of the arrow B by the connecting rod 201, the driving worm 109 pushes the drive shaft 111 out of the coupled state in the axial direction of the latter. After the spring force of the compression spring 113 has been overcome, the claw clutch 131 is then in the decoupled state.

Once the braking operation is ended and the connecting rod 201 is moving in the direction of its original position again, i.e. counter to the direction of the arrow B, the claw clutch 131 is moved back into the position of nonpositive engagement. Until this has happened, there can be no torque transmission from the adjustment toothing 123 to the driving worm 109.

However, when the claw clutch 131 is once again in the position of nonpositive engagement, the rolling movement of the control pinion 9 is transmitted to the worm 7 via the freewheel 13 by virtue of the now opposite direction of rotation, whereby, in turn, driving of the drive shaft 111 via the adjustment toothing 123 would be possible.

However, the worm shaft 2 is initially deflected in the axial direction thereof owing to the axial travel A until, overcoming the force of the axial spring 11, it has been brought into the end position there, in which the first stop surface 3 is in contact with the corresponding first stop 25 of the housing 19. Only after this axial clearance has been overcome does the drive shaft 111 rotate, and only then can the driving worm 109 deflect the driving wheel 103. This process is the actual adjustment process.

From this, therefore, it becomes clear that the axial travel A defines the amount of clearance as regards the transmission of a rotary motion to the driving wheel 103, during which at least one release movement of the brake linings takes place before adjustment becomes active. The less the axial travel A varies during operation, the more reliably the adjusting unit 1 therefore keeps the release clearance constant.

While the above description constitutes the preferred embodiments of the present invention, it will be appreciated that the invention is susceptible to modification, variation and change without departing from the proper scope and fair meaning of the accompanying claims.

LIST OF REFERENCE SIGNS (PART OF THE DESCRIPTION)

1 adjusting unit
2 worm shaft
3 first stop surface
5 second stop surface
6 sliding bearing section
7 worm
9 control pinion
11 axial spring
13 freewheel
15 shaft shoulder
17 recess
19 housing
21 second stop
23 guide recess
25 first stop
100 slack adjuster
101 control disk
102 control arm
103 driving wheel
105 internal profile
107 sealing ring
109 driving worm
111 drive shaft
113 compression spring
115 spring seat
119 spring cover
121 sealing ring
123 adjustment toothing
125 bearing
131 claw clutch
200 brake, in particular drum brake
201 connecting rod
300 vehicle

What is claimed is:

1. An adjusting unit (1) for an automatic slack adjuster (100) of a brake (200), in particular of a commercial vehicle drum brake, the adjusting unit comprising:
    a housing (19),
    a worm shaft (2), which is mounted in the housing (19) so as to be movable between two end positions along an axial travel (A),
    a control pinion (9) arranged on the worm shaft,
    only one axial spring (11),
    a worm (7) arranged on the worm shaft, and
    a freewheel (13), which is designed for power transmission between the control pinion (9) and the worm (7) in a first direction of rotation and for slip between the control pinion (9) and the worm (7) in an opposite, second direction of rotation,
    wherein the worm shaft (2) has a first stop surface (3) and a second stop surface (5), the first stop surface (3) being spaced apart from a corresponding first stop (25) at one of the two end positions of the housing (19), the first stop surface and the second stop surface each configured to be brought into contact with the corresponding first stop (25) or a corresponding second stop (21) of the housing (19) when the worm shaft (2) is moved to one of the two end positions,
    wherein the worm shaft (2) has a sliding bearing section (6) inserted into a guide recess (23) of the housing (19), the sliding bearing section (6) extending from the second stop surface (5) to the corresponding second stop (21) and being in direct contact with the guide recess (23),
    wherein the axial spring (11) is operatively connected to the housing (19) and the worm shaft (2) and is designed to preload the worm shaft (2) in the direction of the corresponding second stop (21).

2. The adjusting unit (1) as claimed in claim 1, wherein the worm (7) is fixedly connected to the worm shaft (2), and the control pinion (9) is coupled to the worm shaft (2) via the freewheel (13).

3. The adjusting unit (1) as claimed in claim 1, wherein the control pinion (9) is arranged for conjoint rotation on the worm shaft (2), and the worm (7) is coupled to the worm shaft (2).

4. The adjusting unit (1) as claimed in claim 1, wherein the axial spring (11) is designed as: a helical spring, diaphragm spring, wave spring or a combination of the above.

5. The adjusting unit (1) as claimed in claim 1, wherein the control pinion (9) is mounted on the worm shaft (2) and has a recess (17) for accommodating the axial spring (11).

6. The adjusting unit (1) as claimed in claim 5, wherein the recess (17) of the control pinion (9) is located on a side facing the first stop surface (3).

7. The adjusting unit (1) as claimed in claim 1, wherein the first stop surface (3) is formed as a shaft end.

8. The adjusting unit (1) as claimed in claim 1, wherein the second stop surface (5) is formed as a shaft shoulder.

9. The adjusting unit (1) as claimed in claim 1, wherein the sliding bearing section (6) is supported loosely in the housing (19) adjacent to the second stop surface (5).

10. The adjusting unit (1) as claimed in claim 9, wherein the sliding bearing section (6) is formed from a hardened metallic material.

11. The adjusting unit (1) as claimed in claim 1, wherein the worm (7) and the control pinion (9) are arranged between the first and second stop surfaces (3, 5) in the axial direction.

12. The adjusting unit (1) as claimed in claim 1, wherein the freewheel (13) is designed as: a wrap spring, roller freewheel, bevel toothing with a preload, locking pawl or a combination of the above.

13. An automatic slack adjuster (100) for a vehicle drum brake comprising an adjusting unit (1) as claimed in claim 1.

14. A vehicle (300) having a plurality of wheels at least one of which being associated with a drum brake (200) having an automatic slack adjuster (100) comprising an adjusting unit (1) as claimed in claim 1.

15. An adjusting unit (1) for an automatic slack adjuster (100) of a brake (200), in particular of a commercial vehicle drum brake, the adjusting unit comprising:
    a housing (19), a worm shaft (2), which is mounted in the housing (19) so as to be movable between two end positions along an axial travel (A), a control pinion (9) arranged on the worm shaft, a worm (7) arranged on the worm shaft, and a freewheel (13), which is designed for power transmission between the control pinion (9) and the worm (7) in a first direction of rotation and for slip between the control pinion (9) and the worm (7) in an opposite, second direction of rotation, wherein the worm shaft (2) has a first stop surface (3) and a second stop surface (5), the first stop surface (3) being spaced apart from a corresponding first stop (25) at one of the two end positions of the housing (19), the first stop surface and the second stop surface each configured to be brought into contact with the corresponding first stop (25) or a corresponding second stop (21) of the housing (19) when the worm shaft (2) is moved to one of the two end positions, wherein the worm shaft has a sliding bearing section (6) inserted into a guide recess (23) of the housing (19), the sliding bearing section (6) extending from the second stop surface (5) to the corresponding second stop (21) and being in direct contact with the guide recess (23), wherein the guide recess (23) is longer than the sliding bearing section (6).

16. An adjusting unit (1) for an automatic slack adjuster (100) of a brake (200), in particular of a commercial vehicle drum brake, the adjusting unit comprising:

a housing (19), a worm shaft (2), which is mounted in the housing (19) so as to be movable between two end positions along an axial travel (A), a control pinion (9) arranged on the worm shaft, a worm (7) arranged on the worm shaft, and a freewheel (13), which is designed for power transmission between the control pinion (9) and the worm (7) in a first direction of rotation and for slip between the control pinion (9) and the worm (7) in an opposite, second direction of rotation, wherein the worm shaft (2) has a first stop surface (3) and a second stop surface (5), the first stop surface (3) being spaced apart from a corresponding first stop (25) at one of the two end positions of the housing (19), the first stop surface and the second stop surface each configured to be brought into contact with the corresponding first stop (25) or a corresponding second stop (21) of the housing (19) when the worm shaft (2) is moved to one of the two end positions, wherein the worm shaft has a sliding bearing section (6) inserted into a guide recess (23) of the housing (19), the sliding bearing section (6) extending from the second stop surface (5) to the corresponding second stop (21) and being in direct contact with the guide recess (23), wherein the entire sliding bearing section (6) overlaps with the guide recess (23) when the second stop surface (5) is in contact with the corresponding second stop (21).

17. The adjusting unit (1) as claimed in claim 16, further comprising only one axial spring (11), the axial spring (11) being operatively connected to the housing (19) and the worm shaft (2) and being designed to preload the worm shaft (2) in the direction of the corresponding second stop (21).

\* \* \* \* \*